United States Patent

Rowan et al.

[11] Patent Number: 5,781,363
[45] Date of Patent: Jul. 14, 1998

[54] SERVO-FREE VELOCITY ESTIMATOR FOR COIL DRIVEN ACTUATOR ARM IN A DATA STORAGE DRIVE

[75] Inventors: Bryan S. Rowan; Louis Joseph Serrano, both of San Jose, Calif.

[73] Assignee: International Business Machines Corporation, Armonk, N.Y.

[21] Appl. No.: 732,554

[22] Filed: Oct. 15, 1996

[51] Int. Cl.$^6$ ................................ G11B 5/596
[52] U.S. Cl. ........................... 360/78.09; 360/75
[58] Field of Search ................... 360/73.01, 75, 360/78.04, 78.09, 78.11; 318/138, 254, 439, 331, 561, 560, 460

[56] References Cited

U.S. PATENT DOCUMENTS

| | | | |
|---|---|---|---|
| 4,168,457 | 9/1979 | Rose | 318/561 |
| 4,524,398 | 6/1985 | Fujiki | 360/78 |
| 4,691,152 | 9/1987 | Ell et al. | 318/616 |
| 4,755,892 | 7/1988 | Carteau et al. | 360/75 |
| 4,864,437 | 9/1989 | Couse et al. | 360/78.06 |
| 4,876,491 | 10/1989 | Squires et al. | 318/138 |
| 4,920,462 | 4/1990 | Couse et al. | 360/78.04 |
| 4,933,785 | 6/1990 | Morehouse et al. | 360/78.04 |
| 4,967,291 | 10/1990 | Touchton et al. | 360/78.04 |
| 5,119,250 | 6/1992 | Green et al. | 360/78.06 |
| 5,296,790 | 3/1994 | Fincher | 318/560 |
| 5,363,359 | 11/1994 | Lee | 369/44.28 |
| 5,485,323 | 1/1996 | Anderson et al. | 360/78.08 |
| 5,510,939 | 4/1996 | Lewis | 360/78.09 |
| 5,615,064 | 3/1997 | Blank et al. | 360/75 |

OTHER PUBLICATIONS

R.E. Eaton et al., "Improved Back Electromagnetic Force Voice Coil Motor Controller", *IBM Technical Disclosure Bulletin*, vol. 38, No. 11, Nov. 1995, pp. 315–316.

"Delta Voltage Control During Actuator Retract", *IBM Technical Disclosure Bulletin*, vol. 35, No. 1B, Jun. 1992, pp. 337–339.

*Primary Examiner*—Nabil Hindi
*Attorney, Agent, or Firm*—Baker Maxham Jester & Meador

[57] ABSTRACT

A system and method for determining the velocity and/or position of a coil driven actuator arm without the aid of servo signals. A sample-hold unit is used to measure no-motion coil voltage in the voice motor coil while applying a predetermined coil current. Then, while the same magnitude (opposite direction) current is applied to move the actuator arm, the coil voltage is measured. The coil voltage is reduced by the measured no-motion coil voltage, producing a measurement of back-emf. The back-emf may be amplified by a predetermined factor to yield an estimation of velocity, and this amount may be integrated to provide a gauge of relative actuator arm position.

16 Claims, 5 Drawing Sheets

SERVO-FREE VELOCITY ESTIMATOR FOR COIL DRIVEN ACTUATOR ARM IN A DATA STORAGE DRIVE

BACKGROUND OF THE INVENTION

1. Field of the Invention

The present invention relates to magnetically driven positioning devices. A more particular aspect of the invention concerns an inexpensive system and method for determining the orientation of a coil driven actuator arm in a magnetic disk drive without the aid of servo signals from the disk.

2. Description of the Related Art

During normal operation of a data storage disk drive, such as a magnetic disk drive, a read/write head senses servo signals stored on a disk as the read head glides across the disk surface. A servo controller interprets the servo signals, and uses these signals to adjust the head's position relative to the disk surface. The servo controller moves the head, either to maintain a desired head position or to travel to a new position, by moving an actuator arm whose tip is secured to the head.

During certain situations, however, servo signals are not available to guide or position the head. For instance, the operation of "parking" the head moves the head away from the region of the disk surface containing data. Consequently, guidance of the head to and from a "park" position cannot be conducted using servo signals.

To overcome this problem, various known methods estimate head velocity by analyzing certain electrical characteristics of an actuator's voice coil motor ("VCM"), which is used to position the actuator arm. Broadly, the VCM includes a wound conductive coil (called a "voice coil") secured to the actuator arm, and one or more permanent magnets. The coil is positioned within the magnetic field of the permanent magnets. Thus, applying a current through the voice coil creates a magnetic force that moves the actuator arm relative to the permanent magnet.

Some known methods estimate the velocity of the actuator arm using the back-emf voltage ("$V_{bemf}$" or "back-emf") present across the voice coil. The back-emf is the voltage drop across the voice coil due to the coil's motion through the field of the permanent magnets. The back-emf is therefore the inductive component of the voltage drop across the voice coil. The back-emf is proportional to the actuator arm's velocity in the ratio of a known constant.

One approach to estimating the arm's velocity involves the following steps. First, the total voice coil voltage is measured, then this sum is converted to the digital domain with an analog-to-digital ("A/D") converter. Next, the calculated ohmic portion of the coil voltage is digitally subtracted, leaving the inductive portion of the coil voltage, i.e., the back-emf. The ohmic portion of the coil voltage may be calculated using a previous measurement of coil resistance and a measurement of the coil current. The resistance is usually measured while the actuator arm is stationary, by measuring the voltage across the voice coil while applying a VCM current that produces no actuator motion.

Although this approach may be adequate for some applications, it may be unsatisfactory for disk drives that cannot afford the expense, space, or processing required to operate an A/D converter.

Another approach estimates back-emf by measuring total coil voltage, and subtracting in the analog domain an estimate of the portion of the coil voltage attributable to coil resistance. This estimate is generated by sampling the voltage across a sense resistor coupled in series with the voice coil, and multiplying this voltage by the ratio between a nominal coil resistance and the nominal sense resistance. This approach is explained in Eaton et al., "Improved Back Electromagnetic Force Voice Coil Motor Controller", IBM Technical Disclosure Bulletin, Vol. 38, No. 11, November 1995. This reference is incorporated by reference in its entirety.

Although useful in some circumstances, the Eaton approach does not account for variations in coil resistance from the estimated coil resistance. Such variations may result from a number of different conditions. For example, normal disk drive operations typically involve heating and cooling of the voice coil, which cause temperature-dependent excursions in the voice coil resistance. In addition, voice coil resistance may also vary from anticipated values due to manufacturing variations. As a result, estimations of back-emf dependent upon a fixed value of coil resistance are not accurate under all circumstances.

This potential inaccuracy is further compounded while removing an actuator arm from a parked position, since the current through the voice coil, and hence the voltage drop due to resistance of the coil, is substantially greater than the current during other actuator movement. In particular, breaking free from a magnetic latch can require large forces: with a coil current on the order of one amp, and a deviation in coil resistance of ± two ohms, the estimated back-emf may be two volts off. In some systems, this may lead to a velocity estimate having an error of ± one meter per second.

SUMMARY OF THE INVENTION

Broadly, the present invention concerns an inexpensive system and method for determining the orientation of a coil driven actuator arm without the aid of servo signals. One embodiment of the invention comprises an apparatus embodied in a velocity estimator, which may be implemented in an environment including a head actuator assembly having a voice coil secured to an actuator arm. The velocity estimator includes a coil sensor to measure analog voltage across the conductive coil. A sample-hold unit is coupled to the analog coil sensor. Responsive to receipt of a sample-activation signal, the sample-hold unit stores an analog signal proportional to the voltage measured by the coil sensor. Advantageously, this voltage is measured when the coil voltage drop is solely attributable to the resistance of the voice coil, i.e. when the actuator arm is stationary. An analog summer has a first input coupled to the output of the sample-hold unit and a second input coupled to the coil sensor. The summer has a summer output providing a signal representative of the voltage being measured by the coil sensor minus the signal being stored by the sample-hold unit. In this configuration, the summer output therefore provides a back-emf signal, representing an estimate of the actuator arm's velocity.

Advantageously, the velocity estimator may also operate using an alternate measurement of voltage drop across the voice coil. Namely, a sense resistor is coupled in series with the conductive coil, and a sense amplifier is provided to measure analog voltage across the sense resistor. A multiplier coupled to the sense amplifier is used to multiply the analog voltage measured by the sense resistor sensor by a predetermined amount; this amount is the nominal resistance of the conductive coil divided by the nominal resistance of the sense resistor. As a result, the multiplier provides a signal representing the portion of coil voltage drop due to coil resistance. A switch is responsive to a first switch-activation signal to couple the sample-hold unit to the summer. The switch is also responsive to a second switch-activation signal to couple the multiplier to the summer. Thus, the switch alternatively provides the summer with the output signal from the sample-hold unit or the output signal from the multiplier.

In another embodiment, the invention may be implemented to provide a method for estimating actuator arm position and/or velocity in a disk drive without relying on servo signals from the disk(s). In one implementation, a first analog voltage is measured across the voice coil while concurrently holding the actuator arm in a fixed position and generating a first electrical current (having a first magnitude and first direction) in the voice coil. Then, a signal representative of the first measured analog voltage is stored. Next, a second predetermined electrical current is generated in the voice coil. This current has the first magnitude but a second direction of flow opposite the first direction. Concurrently, a second analog voltage across the conductive coil is measured. An analog estimated velocity signal is produced by subtracting the stored signal from the measured second analog voltage. This signal can be integrated to produce an analog position signal.

Alternatively, or in combination, steps may be performed to determine an alternate measure of actuator arm velocity. First, current through the conductive coil is measured or estimated. An estimated coil resistance voltage signal is then generated by multiplying the voltage measured across the same resistor by a ratio of nominal voice coil resistance and nominal sense resistor resistance. An alternate analog estimated velocity signal can then be produced by subtracting the nominal coil resistance voltage from a measured analog coil voltage. This estimated velocity signal may be useful, for example, if the coil current has changed since activation of the sample-hold unit, rendering the original estimated coil resistance voltage signal inaccurate.

The invention affords its users with a number of distinct advantages. One implementation of the invention, for example, provides an inexpensive apparatus and technique for determining the orientation of a coil driven actuator in a disk drive without the aid of servo signals from the disk(s). Unlike the prior art, the invention more accurately estimates back-emf by actually measuring a no-motion coil voltage with a predetermined coil current, and then subtracting this value from the coil voltage during movement of the actuator arm using the same magnitude of current. The invention thus avoids inaccuracies that can arise when coil resistance varies from a nominal value due to factors such as temperature or manufacturing. Also, the invention may advantageously be implemented without requiring the expense and complexity of analog-to-digital converters.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Structure

Hardware Environment

Figure 1:
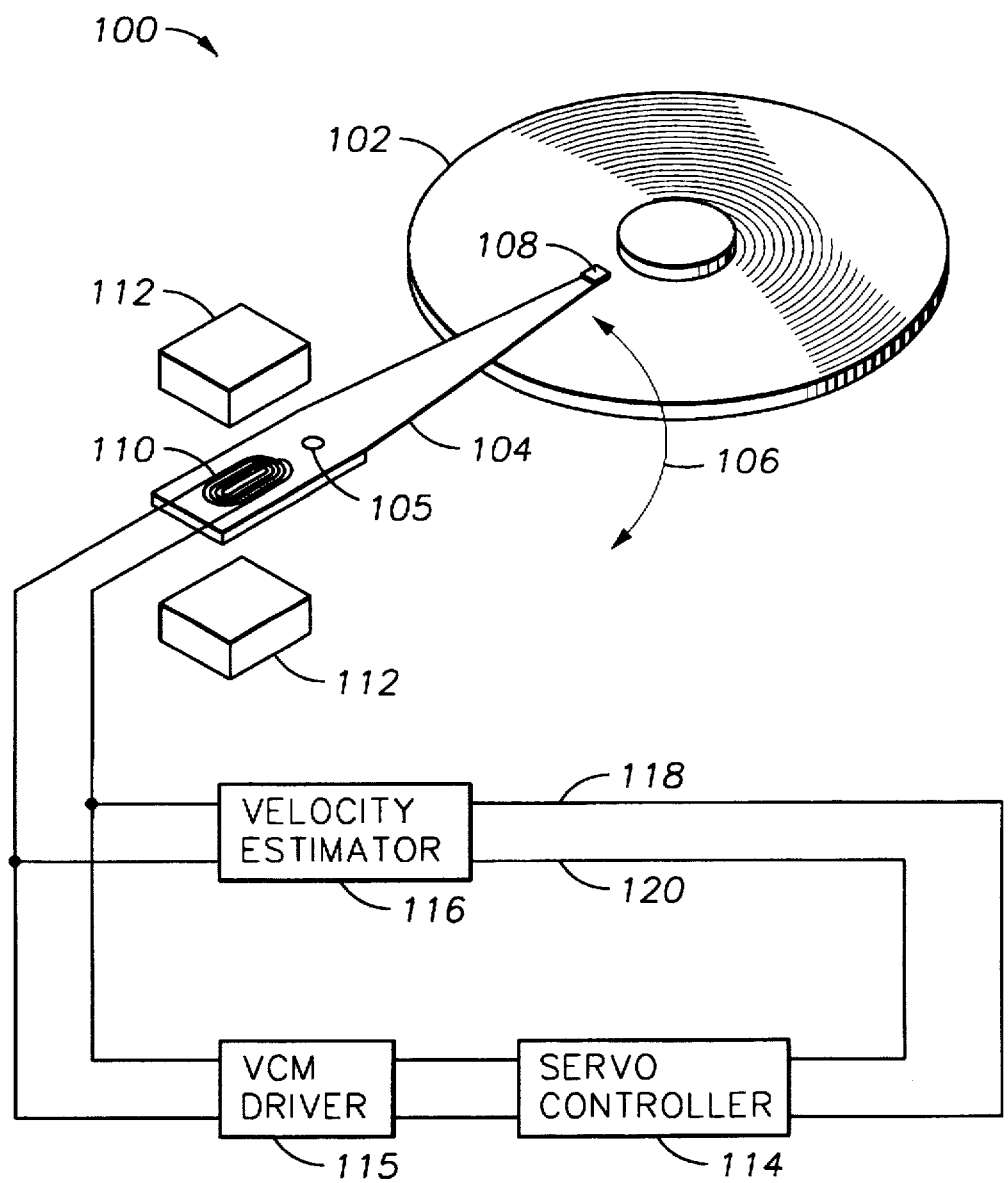
FIG. 1 is a diagram of the hardware components and interconnections of a data storage drive in accordance with the invention.

One aspect of the invention concerns a data storage drive with features to determine the velocity of a coil driven actuator without the aid of servo signals. As an example, this system may be implemented in the data storage drive 100 of FIG. 1. As shown in FIG. 1, the drive 100 includes a disk 102, which may comprise one or more magnetic digital data storage disks or optical disks. An actuator arm 104 is positioned proximate the disk 102, and pivots about a point 105 to move radially as shown by an arrow 106.

The actuator arm 104 includes a read/write head 108, secured to the actuator arm 104 at a location such as a distal end of the arm 104. The read/write head 108 may comprise a transducer for reading and writing data to a magnetic medium, an optical head for exchanging data with an optical medium, or another suitable read/write device. The arm 104 also includes a voice coil 110, which moves relative to one or more magnets 112 when current flows through the voice coil 110. The voice coil 110 and magnets 112 provide a VCM, which may be embodied by a new or conventional VCM, depending upon the needs of the application.

A servo controller 114 generates and applies current to the voice coil 110, via a VCM driver 115. The servo controller 114 guides the arm 104 to position the read/write head 108 over a desired track of data. This process is aided using feedback in the form of servo signals received by the read/write head 108.

The disk drive 100 also includes a velocity estimator 116 coupled to the voice coil 110 to determine characteristics such as head 108 position and/or velocity. In the illustrated example, the estimator 116 includes a velocity output line 118 and a position output line 120. These lines carry signals representative of the radial velocity and position, respectively, of the actuator arm 104. Operation of the velocity estimator 116 is discussed in greater detail below.

The drive 100 may further include a number of further components (not shown), such as a ramp across which the actuator arm 104 moves to a parked position, a latch to hold the actuator arm 104 in the parked position, a disk drive housing, bearings, and a variety of other components. These components, which are not shown for ease of illustration, may be provided by commercially available components, or components whose construction would be apparent to an ordinarily skilled artisan having the benefit of this disclosure.

Velocity Estimator 116

Figure 2:
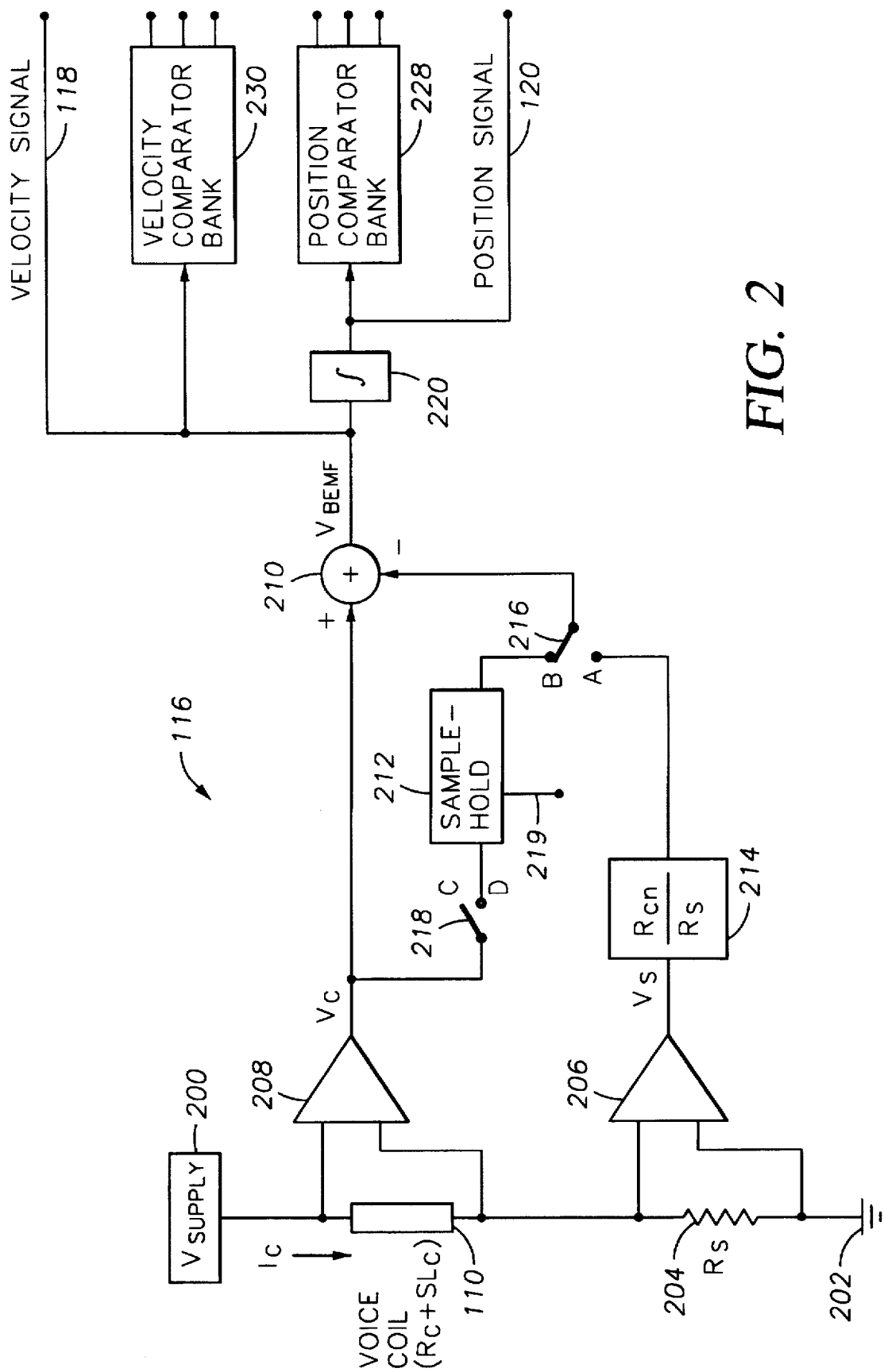
FIG. 2 is a schematic diagram illustrating hardware components and interconnections in a velocity estimator in accordance with the invention.

The hardware components and interconnections of the velocity estimator 116 are illustrated further in FIG. 2. For clarity of illustration, FIG. 2 does not show a number of components, e.g., the actuator arm 104 and magnets 112.

VCM

The voice coil 110 (also called "coil") is electrically connected between a voltage supply 200 and electrical ground 202. The voltage supply 200 may originate from a source such as the VCM driver 115. The voltage supply 200 serves to generate a current ($I_c$) to flow in the coil 110. Although not shown, the coil 110 includes both an inductance ($L_c$) and a resistance ($R_c$).

Sense Resistor

A sense resistor 204 may be coupled in series with the coil 110. The sense resistor 204 preferably comprises a relatively small resistance, provided to sense current through the coil 110. In this regard, a sense amplifier 206 is coupled across the sense resistor 204 to measure the voltage drop ($V_s$) across the sense resistor 204. Similarly, a coil sensor 208 is coupled across the coil 110. Each of the sense amplifier 206 and coil sensor 208 may comprise, for example, an operational amplifier.

Summer

A summer 210 receives the signal provided by the coil sensor 208 and subtracts one of the following signals: (1) a sample-hold signal from a sample-hold unit 212, when a first switch 216 is in position B (as illustrated), or (2) an estimated coil resistance signal from a multiplier 214, when the switch 216 is in position A. A second switch 218 selectively connects (position D) or disconnects (position C) the sample-hold unit 212 to/from the coil sensor 208 and summer 210. Preferably, the first and second switches 216/218 comprise electronic switches.

As discussed in greater detail below, the output of the summer 210 represents the back-emf of the coil 110. This output signal is available on the line 118, which is coupled to the servo controller 114 as shown in FIG. 1. In the illustrated implementation, the back-emf signal represents the radial velocity of the actuator arm 104.

Sample-Hold Unit

The sample-hold unit 212 comprises an analog circuit for sampling the coil voltage ($V_c$) when the switch 218 is closed, and for holding this voltage level. Preferably, the sample-hold unit 212 holds the sampled signal continuously until another sample is taken. In the illustrated embodiment, the sample-hold unit 218 includes a control line 219 coupled to the servo controller 114. By placing a predetermined signal on the control line 219, the servo controller 114 activates the sample-hold unit 218, causing it to sample the coil voltage.

Multiplier

The multiplier 214 serves to multiply the sense voltage ($V_s$) by a predetermined coefficient. In the illustrated embodiment, this coefficient represents the ratio between a nominal resistance of the coil ($R_{cn}$) and a nominal resistance of the sense resistor ($R_s$). As an example, the nominal coil resistance may be a predicted value of coil resistance, or the resistance of the coil 110 measured under prescribed conditions. Likewise, the nominal sense resistance may be a predicted sense resistance, or resistance of the sense resistor 204 measured under certain prescribed conditions. Each value of nominal resistance, however, may differ from the actual resistance at any time, however, due to factors such as temperature, manufacturing variations, etc.

The output of the multiplier 214 may be expressed by Equation 1:

$$\text{multiplier output} = V_s * (R_{cn}/R_s) \qquad [1]$$

The sense voltage divided by the sense resistance equals the coil current, as shown in Equation 2.

$$V_s/R_s = I_c \qquad [2]$$

And, the coil current multiplied by the nominal coil resistance approximates the voltage drop in the coil due to its resistance, as shown in Equation 3.

$$V_{cr} = I_c * R_{cn} \qquad [3]$$

Therefore, substituting Equations 2–3 into Equation 1 shows that the output of the multiplier 214 represents the voltage drop in the coil attributable to its resistance, as shown in Equation 4.

$$\text{multiplier output} = I_c * R_{cn} = V_{cr} \qquad [4]$$

Integrator

Optionally, the velocity estimator 116 may also include an integrator 220. The integrator 220 integrates the output of the summer 210. As the summer 210 outputs the back-emf voltage of the coil 110 (a measure of actuator arm velocity), the integrator 220 provides an indication of actuator arm position relative to a known starting position. This output signal is available on a line 120, which is directed to the servo controller 114 as shown in FIG. 1. In the illustrated implementation, this represents the radial position of the actuator arm 104.

Comparator Banks

Optionally, the velocity estimator 116 may also include a number of comparators to compare the position and/or velocity output signals with pre-established values. The illustrated embodiment includes a velocity comparator bank 230 and a position comparator bank 228. In the illustrated embodiment, each comparator bank 230/228 includes one or more comparators, each comparing the input signal with a different predetermined comparison signal. Each comparator, for example, may provide one output if the input signal exceeds the comparison signal, and a different output if the input signal is less than the comparison signal.

For example, the velocity comparator bank 230 may compare the estimated velocity signal with a very small signal to determine whether the actuator arm 104 is moving. The velocity bank 230 may also compare the estimated velocity signal with other signals, appropriately calibrated, to determine whether the actuator arm 104 is moving in one direction, the opposite direction, faster than an established threshold, slower than an established threshold, etc.

The position comparator bank 228 may compare the estimated position signal with different comparison signals to determine whether the actuator arm 104 is excessively close to a crash stop, where the actuator arm 104 is along the ramp, etc.

Preferably, the comparator banks 228, 230 employ analog comparators, for simplicity of design and ease of implementation. However, analog-to-digital converters may be used instead or in combination, if permitted by design considerations such as space, expense, power availability, etc.

Manufacture

Preferably, the components of the velocity estimator 116 are implemented in the form of an application specific integrated circuit ("ASIC", also called a "custom IC"). This optimizes the space, reliability, and cost of the circuit. However, the velocity estimator 116 may alternatively be implemented using discrete circuit components if desired.

Operation

In addition to the various hardware embodiments described above, a different aspect of the invention concerns methods that estimate actuator arm velocity and/or position in a data storage drive.

Latch Break Operation

Figure 3:
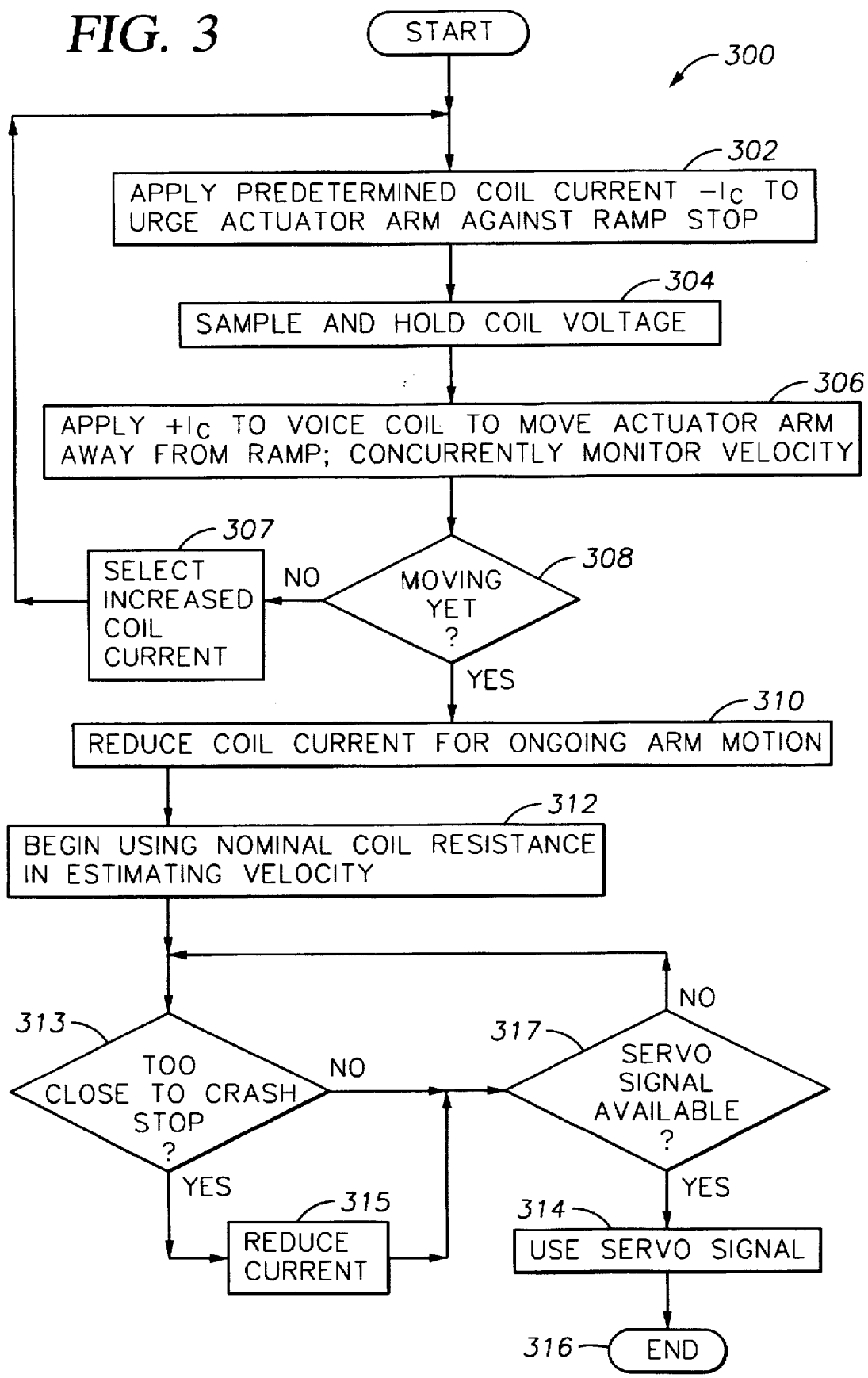
FIG. 3 is a flowchart illustrating steps involved in an illustrative latch break sequence in accordance with the invention.

FIG. 3 shows a sequence of method steps 300 to illustrate one example of the method aspect of the present invention. For ease of explanation, but without any limitation intended thereby, the example of FIG. 3 is described in the context of the storage drive 100 and velocity estimator 116 described above.

Generally, the steps 300 serve to un-park the actuator arm 104 by removing the arm from a latch (not shown) used to hold the arm in its parked position. As is known in the art, an actuator arm is unlatched by moving against its latch with sufficient force to release or "break" the latch. The steps 300 begin in task 302, which begins a procedure for calibrating the sample-hold unit 212. Task 302 begins with the actuator arm 104 being held in place by the latch. In this position, the actuator arm 104 is considered to be parked.

First, the servo controller 114 applies a predetermined coil current ($-I_c$) to the coil 110. For sufficient force to break the latch, $-I_c$ may be around 1 amp as an example. The direction of this current is selected to urge the actuator arm 104 toward the crash stop (not shown). However, the crash stop prevents the arm 104 from moving. Thus, the voltage across the coil ($V_c$) at this time is due entirely to coil resistance ($R_c$), with none of the voltage being attributable to back-emf. In task 304 the sample-hold unit 212 samples the coil voltage and stores this sampled signal. While this voltage is being sampled, the switch 218 must be closed.

Next, in task 306 the servo controller 114 applies an opposite predetermined coil current ($+I_c$) to move the actuator arm 104 away from the crash stop and toward the disk 102. In the illustrated embodiment, the coil current ($+I_c$) may be about one amp, maintained for about five milliseconds. Concurrently, the back-emf of the coil 110 is monitored to provide an estimation of actuator arm velocity. In particular, the switch 216 is set to couple the sample-hold unit 212 to the summer 210. The summer 210 therefore reduces the total coil voltage ($V_c$) by the coil voltage due to resistance, resulting in the back-emf (i.e., voltage due to the inductive component of the coil). During task 306, the switch 218 is open.

The back-emf may be divided by a predetermined constant (k) to provide an estimation of velocity, as shown in Equation 5 below. The constant (k) may be about two volts/meter/second, for example.

$$\text{estimated velocity} = \text{back-emf}/k \qquad [5]$$

As part of task 306, the servo controller 114 may perform additional steps (not shown) to correct the actuator arm's velocity to a predetermined velocity. This is achieved by comparing the estimated velocity to the predetermined velocity, and either increasing or decreasing the coil current appropriately.

After task 306, query 308 determines whether the arm 104 has started moving yet. This is achieved by using the velocity comparator bank 230 to determine whether the estimated velocity is greater than zero. To accommodate a margin of error, task 306 may alternatively determine whether the estimate velocity exceeds a predetermined velocity slightly greater than zero, e.g. one meter per second. In an alternative embodiment, instead of determining whether the actuator arm has a non-zero velocity, the position comparator bank 228 may be used to determine whether the actuator arm's position has changed from an initial position.

If the arm 104 does not move, task 307 selects an increased coil current to boost the magnetic force applied to the arm 104. Then the calibration steps 302/304 are repeated, and attempts are renewed to break the latch in task 306.

When query 308 finds that the arm 104 is moving, the servo controller 114 in task 310 reduces the coil current ($+I_c$) for ongoing movement of the arm 104. Initially moving the actuator arm requires a significantly larger coil current than ongoing movement or the arm. However, the estimate of back-emf based on the sample-hold unit 212 is only accurate for the specific value of coil current used during calibration (tasks 302–304). Therefore, having reduced the coil current, task 312 is performed to begin using a different estimate of back-emf, which is broadly applicable to different coil currents. Namely, task 312 operates the switch 216 to couple the multiplier 214 to the summer 210. As a result, the back-emf is determined as shown in Equation 6, below.

$$\text{estimated back-emf} = V_c - V_s(R_{cn}/R_s) \qquad [6]$$

This estimate of back-emf is not as precise as estimates employing the output of the sample-hold unit 212, since the actual coil resistance ($R_c$) varies from the nominal value ($R_{cn}$) with changing temperature and manufacturing conditions. However, having reduced the coil current in task 312, the output of the multiplier 214 is substantially smaller. As a result, errors in the calculated back-emf are also small.

After task 312, query 313 integrates the estimated velocity of task 312 to determine the arm's position. Using this signal (shown on line 120, FIG. 2), query 313 determines whether the arm is positioned too close to a crash stop (not shown). As known in the art, crash stops are provided in head disk assemblies to prevent actuator arms from travelling beyond predetermined radial positions. If query 313 finds that the actuator arm 104 is too near a crash stop, task 315 reduces the coil current and proceeds to query 317. Query 313 proceeds directly to query 317 if the actuator arm 104 is found to be sufficiently far from a crash stop.

Query 317 determines whether the head 108 can detect servo signals on the disk 102 yet. If not, control returns to query 313. However, when query 317 determines that the head 108 is receiving a servo signal from the disk 102, this signal is used to determine the position and velocity of the actuator arm 104, as shown in task 314. The routine 300 then ends in task 316.

Loss of Servo Signal

Figure 4:
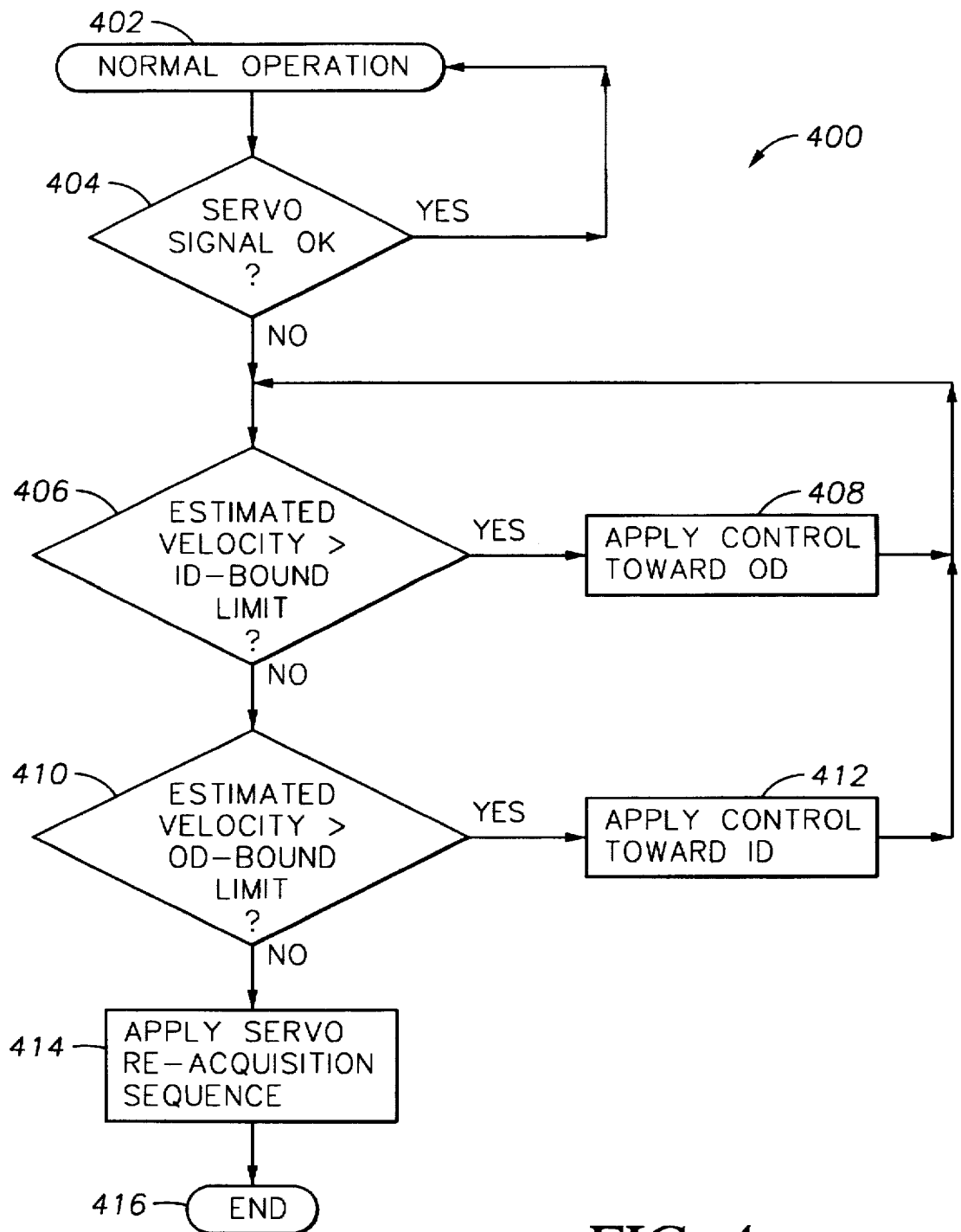
FIG. 4 is a flowchart illustrating steps involved in an illustrative loss of servo signal sequence in accordance with the invention.

FIG. 4 shows another sequence of method steps 400 to illustrate a different example of the method aspect of the present invention. Generally, the sequence 400 provides one embodiment of a method for preventing crash stop impact during operation without any servo signal. The sequence 400 is described in the context of the storage drive 100 and velocity estimator 116 described above for ease of explanation, but without any limitation intended thereby.

Broadly, the sequence 400 determines whether the velocity of the actuator arm 104 is within predetermined limits, and if not, the sequence 400 takes appropriate responsive action. Task 402 depicts normal operation of the drive 100, where the head 108 is positioned according to servo signals detected from the disk 102. Query 404 asks whether servo signals from the disk 102 are being properly received. If so, normal operation of the drive 100 continues in task 402. However, if query 404 determines that the head 108 is no longer properly receiving servo signals, certain actions are taken to ensure that the actuator arm 104 does not contact one of its crash stops.

In particular, query 406 determines whether the actuator arm's estimated velocity (line 118) exceeds a predetermined inner-diameter-bound ("ID bound") velocity limit. In accordance with the invention, the estimated velocity is preferably obtained from the signal on line 118 (FIG. 1), as discussed above. In other words, query 406 determines whether the actuator arm is moving toward the ID too fast. If so, task 408 applies an appropriate current to the voice coil 110 to move the arm 104 toward the outer diameter ("OD"). After task 408, control is returned to query 406.

If query 406 determines that the arm's velocity does not exceed the ID bound limit, query 410 is performed. Query 410 determines whether the actuator arm 104 is moving too quickly toward the OD. Specifically, query 410 determines whether the estimated velocity (line 118) exceeds a predetermined OD-bound velocity limit. If so, query 412 applies an appropriate current to the voice coil 110 to move the arm 104 toward the ID. After task 412, control returns to query 406.

After queries 406 and 410 established that the actuator arm 104 is not speeding toward the ID or OD crash stops, task 414 applies a servo re-acquisition sequence, wherein the actuator arm 104 and head 108 are operated to re-acquire servo signals from the disk 102. This step, for example, may involve the application of techniques that should be apparent to those of ordinary skill in the art, having the benefit of this disclosure. After the servo signal is reacquired, the routine 400 ends in task 416.

Ramp Unload

Figure 5:
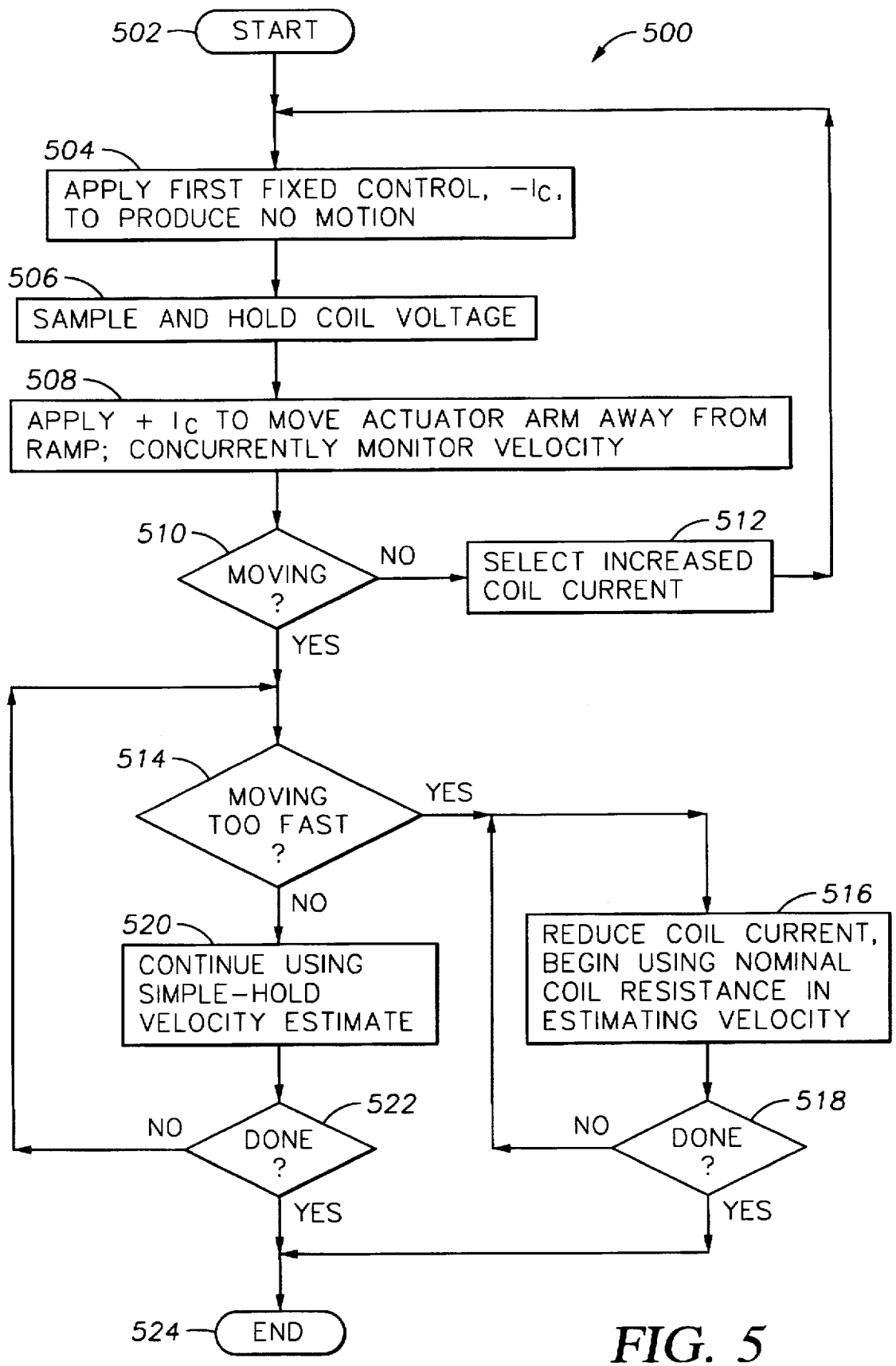
FIG. 5 is a flowchart illustrating steps involved in an illustrative ramp unload sequence in accordance with the invention.

FIG. 5 shows a sequence of method steps 500 to illustrate a different example of the method aspect of the present invention. Generally, the sequence 500 provides one embodiment of a ramp unload sequence. The sequence 500 is described in the context of the storage drive 100 and velocity estimator 116 described above for ease of explanation, but without any limitation intended thereby.

Broadly, the sequence 500 serves to move the actuator arm 104 along a ramp (not shown) toward servo signals on the disk 102 prior to acquisition of any servo signals from the disk 102. As is known in the art, many actuator arms can be parked by moving the actuator arm along a ramp toward a crash stop whose location does not permit guidance of the arm with use of servo signals.

After the steps 500 begin in task 502, task 504 begins a procedure for calibrating the sample-hold unit 212. Task 504 begins with the actuator arm 104 residing against or near a crash stop along the neighboring ramp. In this position, the actuator arm 104 is considered to be parked. First, the servo controller 114 applies a predetermined coil current ($-I_c$) to the coil 110. The direction of this current is selected to urge the actuator arm 104 toward the crash stop (not shown). However, the crash stop prevents the arm 104 from moving. Thus, the voltage across the coil ($V_c$) at this time is due entirely to coil resistance ($R_c$), with none of the voltage being attributable to back-emf. In task 506, the sample-hold unit 212 samples the coil voltage and stores this sampled signal. While this voltage is being sampled, the first switch 218 must be closed.

Next, in task 508, the servo controller 114 applies an opposite predetermined coil current ($+I_c$) to move the actuator arm 104 away from the crash stop and toward servo signals on the disk 102. Concurrently, the back-emf of the coil 110 is monitored to provide an estimation of actuator arm velocity. In particular, the switch 216 is set to couple the sample-hold unit 212 to the summer 210. The summer 210 therefore subtracts the coil voltage due to resistance from the total coil voltage, resulting in the back-emf (i.e., voltage due to the inductive component of the coil). During task 508, the first switch 218 is open.

The back-emf may be multiplied by a predetermined constant to provide an estimation of velocity, as discussed above. After task 508, query 510 determines whether the actuator arm 104 is moving along the ramp. This is achieved by determining whether the estimated velocity is greater than zero, or some predetermined threshold such as one meter/second. If query 510 finds that the actuator arm 104 is not moving, an increased coil current is selected in task 512 and the velocity estimator 116 is re-calibrated based on the increased current in tasks 504 and 506.

After the increased coil current is applied in task 508, query 510 again determines whether the actuator arm 104 is moving. If so, query 514 determines whether the actuator arm 104 is moving too fast. This is preferably achieved by using the velocity comparator bank 230 to compare the estimated velocity signal to an appropriate velocity threshold. If the arm 104 is moving too fast, task 516 reduces the coil current. However, the estimate of back-emf based on the sample-hold unit 212 is only accurate for the specific value of coil current used during calibration (tasks 504–506). Therefore, having reduced the coil current, task 516 begins using a different estimation of back-emf, which is broadly applicable to different coil currents. Namely, the switch 216 is operated to couple the multiplier 214 to the summer 210. As a result, the back-emf is determined as discussed above in association with the Equation 6.

Alternatively, if query 514 determines that the actuator arm 104 is not moving too fast, the present coil current is maintained and task 520 continues to use the velocity estimate from the sample-hold unit 212. After either of queries 522 or 518 determines that the actuator arm 104 has completed traversing the ramp, the routine 500 ends in task 524. A determination of queries 522 and 518, for example, may consider whether the head 108 has acquired servo signals from the disk 102.

Other Embodiments

While there have been shown what are presently considered to be preferred embodiments of the invention, it will be apparent to those skilled in the art that various changes and modifications can be made herein without departing from the scope of the invention as defined by the appended claims.

For example, monitoring of the position and velocity of the actuator arm may be applied in many different variations, combinations, and implementations. Position and/or velocity of the actuator arm may be monitored, compared to predetermined values, or otherwise processed during latch break sequence, ramp movement sequence, servo signal outages, ongoing data access without a servo loss, etc.

As another alternative, the velocity estimator of the invention may employ a "current mirror" instead of the sense resistor 204 to estimate current through the coil 110. Current mirrors, many of which are known in the art, provide electrical circuits that simulate one or more electrical characteristics of mirrored circuitry, facilitating measurement of such characteristics without disturbing the mirrored circuitry.

What is claimed is:

1. An apparatus for estimating velocity of a positioning device including a motor coil secured to an actuator arm, said apparatus comprising:

an analog coil sensor to measure analog voltage across the coil;

a sample-hold unit coupled to the analog coil sensor and responsive to receipt of a sample-activation signal to store an analog signal representative of analog voltage measured by the coil sensor; and an analog summer having a first input coupled to the sample-hold unit, having a second input coupled to the coil sensor, the summer also having a summer output, said summer providing on the summer output an analog estimated velocity signal representative of the voltage being measured by the coil sensor reduced by the signal being stored by the sample-hold unit.

2. The apparatus of claim 1, further comprising:
an analog integrator coupled to the summer output to provide an estimated position signal by integrating the estimated velocity signal.

3. The apparatus of claim 1, the coil including a sense resistor in electrical series therewith, said apparatus further comprising:
a sense amplifier to measure analog voltage across the sense resistor;
a multiplier coupled to the sense amplifier to multiply the analog voltage measured by the sense amplifier by a predetermined amount, said amount being representative of a ratio between a nominal resistance of the coil and a nominal resistance of the sense resistor;
a switch responsive to a first switch-activation signal to couple the first input of the summer to the sample-hold unit, said switch being responsive to a second switch-activation signal to couple the first input of the summer to the multiplier; and
wherein the summer provides on the summer output an analog estimated velocity signal representing the voltage being measured by the coil sensor reduced by the signal being received at the first input.

4. The apparatus of claim 1, further comprising:
a current mirror to generate an analog current representing current through the coil;
a multiplier coupled to the current mirror to multiply the analog current provided by the current mirror by a signal representing a nominal resistance of the coil;
a switch responsive to a first switch-activation signal to couple the first input of the summer to the sample-hold unit, said switch being responsive to a second switch-activation signal to couple the first input of the summer to the multiplier; and
wherein the summer provides on the summer output an analog estimated velocity signal representing the voltage being measured by the coil sensor reduced by the signal being received at the first input.

5. The apparatus of claim 1, further comprising a comparator coupled to the summer output to compare the estimated velocity signal to a predetermined comparator input signal and provide a comparator output signal responsive to said comparison.

6. The apparatus of claim 1, further comprising an analog-to-digital converter coupled to the summer output.

7. The apparatus of claim 2, further comprising a comparator coupled to the integrator to compare the estimated position signal to a predetermined comparator input signal and provide a comparator output signal responsive to said comparison.

8. The apparatus of claim 2, further comprising an analog-to-digital converter coupled to the integrator.

9. A disk drive storage mechanism, comprising:
a head actuator assembly, comprising:
an actuator arm;
a motor coil secured to the actuator arm; and
a coil magnet mounted proximate the coil in a predetermined orientation thereto;
a servo controller, to generate a selected electrical current in the coil;
an analog coil sensor to measure analog voltage across the coil;
a sample-hold unit coupled to the analog coil sensor and responsive to receipt of a sample-activation signal to store an analog voltage signal representative of analog voltage measured by the coil sensor; and
an analog summer having a first input coupled to the sample-hold unit, having a second input coupled to the coil sensor, the summer also having a summer output, said summer providing on the summer output an analog estimated velocity signal representative of the voltage being measured by the coil sensor reduced by the voltage signal being stored by the sample-hold unit.

10. The mechanism of claim 9, further comprising:
an analog integrator coupled to the summer output to provide an estimated position signal by integrating the estimated velocity signal.

11. The mechanism of claim 9, the conductive coil including a sense resistor in electrical series therewith, said apparatus further comprising:
a sense resistor sensor to measure analog voltage across the sense resistor;
a multiplier coupled to the sense resistor sensor to multiply the analog voltage measured by the sense resistor sensor by a predetermined amount, said amount being representative of a steady state resistance of the conductive coil divided by a resistance of the conductive coil divided by a resistance of the sense resistor; and
a switch responsive to a first switch-activation signal to couple the first input of the summer to the sample-hold unit, said switch being responsive to a second switch-activation signal to couple the first input of the summer to the multiplier; and
wherein the summer provides on the summer output an analog estimated velocity signal representing the voltage being measured by the coil sensor reduced by the signal being received at the first input.

12. The mechanism of claim 9, further comprising:
a current mirror to generate an analog current representing current through the coil;
a multiplier coupled to the current mirror to multiply the analog current provided by the current mirror by a signal representing a nominal resistance of the coil; and
a switch responsive to a first switch-activation signal to couple the first input of the summer to the sample-hold unit, said switch being responsive to a second switch-activation signal to couple the first input of the summer to the multiplier; and
wherein the summer provides on the summer output an analog estimated velocity signal representing the voltage being measured by the coil sensor reduced by the signal being received at the first input.

13. The mechanism of claim 9, further comprising a comparator coupled to the summer output to compare the estimated velocity signal to a predetermined comparator input signal and provide a comparator output signal responsive to said comparison.

14. The mechanism of claim 9, further comprising an analog-to-digital converter coupled to the summer output.

15. The mechanism of claim 13, further comprising a comparator coupled to the integrator to compare the estimated position signal to a predetermined comparator input signal and provide a comparator output signal responsive to said comparison.

16. The mechanism of claim 13, further comprising an analog-to-digital converter coupled to the integrator.

* * * * *